US007578935B2

(12) United States Patent
Lin et al.

(10) Patent No.: US 7,578,935 B2

(45) Date of Patent: Aug. 25, 2009

(54) SEPARATION DEVICE OF RADIOISOTOPE TL-201

(75) Inventors: Wuu-Jyh Lin, Longtan Township, Taoyuan County (TW); Ting-Shien Duh, Longtan Township, Taoyuan County (TW); Ying-Ming Tsai, Pingjhen (TW); Sun-Rong Huang, Longtan Township, Taoyuan County (TW); Chien-Hsin Lu, Longtan Township, Taoyuan County (TW); Mao-Hsung Chang, Hukou Township, Hsinchu County (TW); Jenn-Tzong Chen, Taipei (TW)

(73) Assignee: Atomic Energy Council—Institute of Nuclear Energy Research, Taoyuan (TW)

( * ) Notice: Subject to any disclaimer, the term of this patent is extended or adjusted under 35 U.S.C. 154(b) by 438 days.

(21) Appl. No.: 11/518,411

(22) Filed: Sep. 11, 2006

(65) Prior Publication Data

US 2008/0063571 A1 Mar. 13, 2008

(51) Int. Cl.
*B01D 59/26* (2006.01)

(52) U.S. Cl. .................... 210/202; 210/257.1; 210/258; 210/259; 210/287; 210/416.1; 210/418; 210/502.1

(58) Field of Classification Search ................. 376/189, 376/195; 210/252, 254, 258, 259, 263, 287, 210/199, 202, 416.1, 418, 257.1, 502.1
See application file for complete search history.

(56) References Cited

U.S. PATENT DOCUMENTS

| | | | | |
|---|---|---|---|---|
| 3,993,538 | A * | 11/1976 | Lebowitz et al. | 376/195 |
| 6,787,042 | B2 * | 9/2004 | Bond et al. | 210/681 |
| 2007/0098607 | A1 * | 5/2007 | Tang et al. | 423/2 |

* cited by examiner

*Primary Examiner*—Matthew O Savage
(74) *Attorney, Agent, or Firm*—Troxell Law Office PLLC

(57) ABSTRACT

A device to rapidly obtain a solution of Pb(lead)-201 from a solution of a solid target material of Tl(thallium)-203. The solution of Pb-201 is then processed through a degeneration and an ion exchange to obtain in Tl-201 radioisotope.

2 Claims, 2 Drawing Sheets

SEPARATION DEVICE OF RADIOISOTOPE TL-201

FIELD OF THE INVENTION

The present invention relates to a separation device; more particularly, relates to fast separating out a Pb-201 solution to be processed through a degeneration and an ion exchange for obtaining Tl-201 radioisotope.

DESCRIPTION OF THE RELATED ART

Tl-201 thallous chloride ($^{201}TlCl_2$) can be absorbed by and gathered at heart muscle. Therefore, Tl-201 can be used in a myocardial image for diagnosing heart disease; and can also be applied in other medical diagnoses, like a tumor image. Hence, Tl-201 is one of the most commonly used radioisotope in the field of nuclear medicine.

Generally, to produce a Tl-201, as revealed in "Production of Tl-201 and Pb203 via Proton Induced Nuclear Reaction on Natural Thallium," by Qaim S. M., Weinreich R. and Ollig H., International Journal of Applied Radiation and Isotopes, 30 (1979) pp. 85-95, Tl-201 is directly washed out. But the Tl-201 directly washed out Contains impurities quite often so that its purity is not good. Hence, the prior art does not fulfill users' requests on actual use.

SUMMARY OF THE INVENTION

The main purpose of the present invention is to fast separate a Pb-201 solution from a solution of a solid target material of Tl-203 to be processed through a degeneration and an ion exchange for obtaining Tl-201 radioisotope.

To achieve the above purpose, the present invention is a separation device of radioisotope Tl-201, comprising a dissolving unit; a vacuum unit connecting to a first control valve, a second control valve and a third control valve; a first glass unit connecting to a fourth control valve at an end and the first control valve at another end; a sedimentation unit connecting to a three way control valve; a second glass unit connecting to a fifth control valve at an end and the second control valve at another end; an ion exchange column connecting to a sixth control valve at an end and the fifth control valve at another end; a Pb(lead)-201 collection bottle; a third glass unit connecting to a seventh control valve at an end and the third control valve at another end; and a Tl(thallium)-203 collection bottle, where the three way control valve is connected with an eighth control valve. Accordingly, a novel separation device of radioisotope Tl-201 is obtained.

BRIEF DESCRIPTIONS OF THE DRAWINGS

Figure 1:
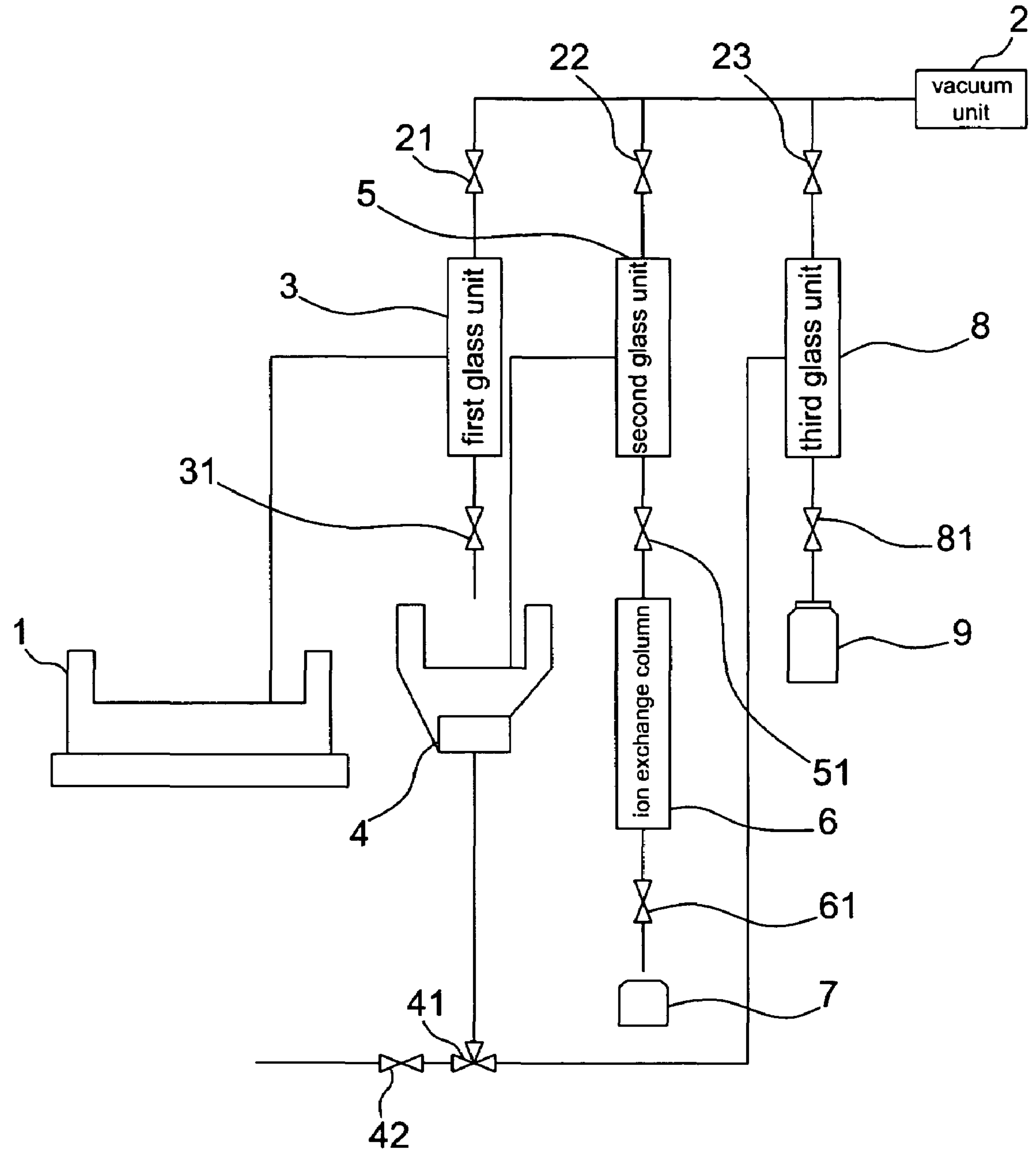
Figure 2:
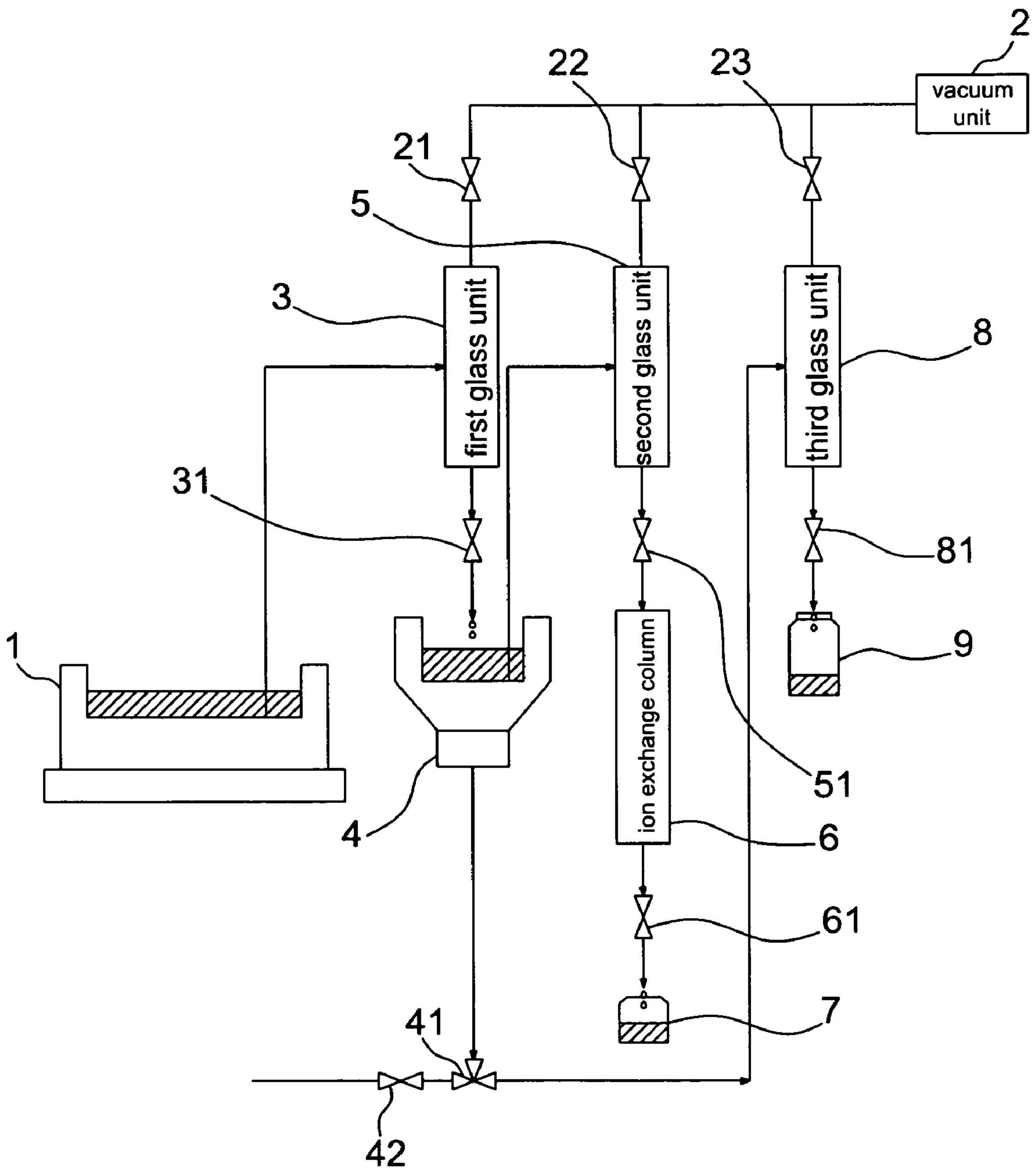

The present invention will be better understood from the following detailed description of the preferred embodiment according to the present invention, taken in con junction with the accompanying drawings, in which FIG. 1 is the view showing the structure of the preferred embodiment according to the present invention; and FIG. 2 is the view showing the state of use of the preferred embodiment.

DESCRIPTION OF THE PREFERRED EMBODIMENT

The following description of the preferred embodiment is provided to understand the features and the structures of the present invention.

Please refer to FIG. 1, which is a view showing a structure of a preferred embodiment according to the present invention. As shown in the figure, the present invention is a separation device of radioisotope Tl-201, comprising a dissolving unit 1; a vacuum unit 2 connecting to a first control valve 21, a second control valve 22 and a third control valve 23; a first glass unit 3 connecting to a fourth control valve 31 at an end and the first control valve 21 at another end; a sedimentation unit 4 connecting to a three way control valve 41; a second glass unit 5 connecting to a fifth control valve 51 at an end and the second control valve 22 at another end; an ion exchange column 6 connecting to a sixth control valve 61 at an end and the fifth control valve 51 at another end; a Pb(lead)-201 collection bottle 7; a third glass unit 8 connecting to a seventh control valve 81 at an end and the third control valve 23 at another end; and a Tl(thallium)-203 collection bottle 9, where the three way control valve 41 is connected with an eighth control valve 42. Thus, a novel separation device of radioisotope Tl-201 is obtained to fast separate out Pb-201.

Please refer to FIG. 2, which is a view showing a state of use of the preferred embodiment. As shown in the figure, by using the present invention, a solution of a solid target material of Tl-203 is separated to obtain a Pb-201 Solution and the Pb-201 solution is processed through a degeneration and an ion exchange to obtain a Tl-201 radioisotope.

When using the present invention, a solid target material of Tl-203 having Pb-201 is deposed in a dissolving unit 1, where a 1.6 N nitric acid, ferric ions and water for injection are added to dissolve the solid target material of Tl-203 into a solution.

A first control valve 21 is opened to suck the solution of Tl-203 having Pb-201 by a vacuum unit 2 into a first glass unit 3. The first control valve 21 is shut and ammonia is added to be mixed together. A fourth control valve 31 is opened to drop the solution of Tl-203 having Pb-201, which is mixed with ammonia, into a sedimentation unit 4 to be added with water so that a solution of Tl-203 and a solution of Pb-201 is separated.

A second control valve 22 is opened to suck the Pb-201 solution by the vacuum unit 2 from the sedimentation unit 4 into a second glass unit 5 to be added with a 8N hydrochloric acid for mixing together. A fifth control valve 51 is opened to drop the solution of Pb-201 into an ion exchange column 6 for ion exchange with resin to filter out iron from the solution of Pb-201. A sixth control valve 61 is opened to drop a pure solution of Pb-201 into a Pb-201 collection bottle 7.

Then a three way control valve 41 and a third control valve 23, which are connected with the sedimentation unit 4 are opened to suck the Tl-203 solution by the vacuum unit 2 from the sedimentation unit 4 into a third glass unit 8. The third control valve 23 is shut and the seventh control valve 81 is opened to drop the solution of Tl-203 into a TL-203 collection bottle.

Then the solution of Pb-201 in the Pb-201 collection bottle 7 is processed through a degeneration to obtain a solution of Tl-201 from the solution of Pb-201. In the end, an ion exchange is processed to obtain a Tl-201 radioisotope. Therein, the three way control valve 41 is connected with an eighth control valve 42 to control the in put of nitrogen gas.

To sum up, the present invention is a separation device of radioisotope Tl-201, where a Pb-201 solution is fast separated from a solution of a solid target material of Tl-203 to be processed through a degeneration and an ion exchange for obtaining Tl-201 radioisotope.

The preferred embodiment herein disclosed is not intended to unnecessarily limit the scope of the invention. Therefore, simple modifications or variations belonging to the equivalent of the scope of the claims and the instruction disclosed herein for a patent are all within the scope of the present invention.

What is claimed is:

1. A separation device of radioisotope Tl-201, comprising:

a dissolving unit;

a vacuum unit, said vacuum unit being connected with a first control valve, a second control valve and a third control valve;

a first glass unit, said first glass unit being connected with a fourth control valve at an end of said first glass unit, said first glass unit being connected with said first control valve at another end of said first glass unit, and said first glass unit being connected to said dissolving unit at a side of said glass unit;

a sedimentation unit, said sedimentation unit being connected with said fourth control value at one end and with a three way control valve at the other end;

a second glass unit, said second glass unit being connected with a fifth control valve at an end of said second glass unit, said second glass unit being connected with said second control valve at another end of said second glass unit;

an ion exchange column, said ion exchange column being connected with a sixth control valve at an end of said ion exchange column, said ion exchange column being connected with said fifth control valve at another end of said ion exchange column;

a Pb(lead)-201 collection bottle in communication with said sixth control valve;

a third glass unit, said third glass unit being connected with a seventh control valve at an end of said third glass unit, said third glass unit being connected with said third control valve at another end of said third glass unit; and a Tl(thallium)-203 collection bottle in communication with said seventh control valve.

2. The device according to claim 1, wherein said three way control valve is connected with an eighth control valve.

* * * * *